(12) United States Patent
Yip et al.

(10) Patent No.: US 7,331,039 B1
(45) Date of Patent: Feb. 12, 2008

(54) METHOD FOR GRAPHICALLY DISPLAYING HARDWARE PERFORMANCE SIMULATORS

(75) Inventors: Sherman H. Yip, San Francisco, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 10/688,763

(22) Filed: Oct. 15, 2003

(51) Int. Cl.
*G06F 9/44* (2006.01)
*G06F 3/048* (2006.01)

(52) U.S. Cl. ............... 717/125; 717/128; 717/135; 715/772; 715/967

(58) Field of Classification Search ............... 717/125, 717/128; 345/581–681; 715/772, 967
See application file for complete search history.

(56) References Cited

U.S. PATENT DOCUMENTS

| | | | |
|---|---|---|---|
| 5,935,238 A | 8/1999 | Talcott et al. | |
| 5,940,618 A | 8/1999 | Blandy et al. | |
| 5,964,869 A | 10/1999 | Talcott et al. | |
| 6,175,364 B1 * | 1/2001 | Wong et al. | ............... 715/763 |
| 6,314,514 B1 | 11/2001 | McDonald | |
| 6,625,572 B1 | 9/2003 | Zemlyak et al. | |
| 6,853,968 B2 | 2/2005 | Burton | |
| 6,856,950 B1 | 2/2005 | Abts et al. | |
| 6,895,372 B1 | 5/2005 | Knebel et al. | |
| 7,035,764 B2 | 4/2006 | Rui et al. | |
| 7,058,560 B1 | 6/2006 | Arakawa et al. | |
| 7,058,928 B2 * | 6/2006 | Wygodny et al. | ............ 717/128 |
| 2002/0062208 A1 * | 5/2002 | Gomez et al. | ................ 703/21 |
| 2003/0191620 A1 | 10/2003 | Williams et al. | |
| 2004/0175684 A1 | 9/2004 | Kaasa et al. | |
| 2005/0114842 A1 | 5/2005 | Fleehart et al. | |

OTHER PUBLICATIONS

Austin et al., SimpleScalar: An Infrastructure for Computer System Modeling, Feb. 2002, IEEE.*
Drongowski et al., Profiling to Tune C Programs on Alpha, Apr. 6, 2001, Hewlett Packard Company.*
Hollingsworth et al., The Clipper Processor: Instruction Set Architecture And Implementation, Feb. 1989, ACM.*

(Continued)

*Primary Examiner*—Tuan Dam
*Assistant Examiner*—Ben C Wang
(74) *Attorney, Agent, or Firm*—Martine Penilla & Gencarella, LLP

(57) ABSTRACT

A method for graphically tracking progression of instructions through hardware components. Instructions of a code segment are defined by graphical icons where each graphical icon has a displayable appearance that identifies a type of instruction. The method tracks each graphical icon when simulating execution of the code segment through the hardware components. The method then displays a progression of each graphical icon through the hardware components during execution of the code segment.

24 Claims, 6 Drawing Sheets

OTHER PUBLICATIONS

Sherwood et al., A Pipelined Memory Architecture for High Throughput Network Processors, Jun. 2003, IEEE.*
Weaver et al., "Performance Analysis Using Pipeline Visualization", 2001, IEEE, pp. 1-10.*
Campenhout, "ESCAPE: Environment for the Simulation of Computer Architectures for the Purpose of Education", 1998, University of Ghent, pp. 1-6.*
U.S. Appl. No. 10/692,875, filed Oct. 24, 2003, Caprioli et al.
J.Gao, E. Y. Zhu, and S. Shim, "Monitoring Software Components and Component-Based Software," San Jose State University, Mar. 1, 1998, pp. 1-12 and one extra sheet shows the date the PDF created.
L. Chen, S. Dropsho, and D.H. Albonesi, "Dynamic Data Dependence Tracking and its Application to Branch Prediction," 2000 IEEE, pp. 1-12.

* cited by examiner

| TIME | FETCH UNIT | INSTRUCTION BUFFER | ADD_UNIT |
|---|---|---|---|
| 17 | i107 | i106 | |
| 18 | | i107 | i106 |
| 19 | | | i107 |
| 20 | | | |
| 21 | | | |
| 22 | | | |
| 23 | | | |

*Fig. 1 (Prior Art)*

METHOD FOR GRAPHICALLY DISPLAYING HARDWARE PERFORMANCE SIMULATORS

BACKGROUND OF THE INVENTION

1. Field of the Invention

The present invention relates to hardware performance simulators and, more particularly, to a method for graphically tracking instructions being examined by hardware performance simulators.

2. Description of the Related Art

A performance simulator is a computer program that simulates electronic hardware components to assist an engineer in designing hardware components. The performance simulator can simulate or model hardware components much faster than building and coding actual hardware components. As a result, the performance simulator often serves as a starting point for development of new hardware.

The performance simulator is a powerful tool that allows the engineer to quickly explore the applicability of various hardware designs, to check for design errors, to analyze designs, and to determine performance tradeoffs. In order to check for errors, i.e., debugging, in either the performance simulator itself or the hardware design, the engineer needs to know the internal operation of the individual components in the hardware (and performance simulator) and how they interact. For example, the engineer designs a microprocessor chip architecture that should take three clock cycles to execute a floating point instruction. However, the performance simulator may erroneously indicate that the proposed architecture is taking four cycles. One way the engineer can check whether the error originated from the performance simulator or from the hardware design is to trace the progression of instructions executing through the simulated hardware components in the performance simulator.

As shown in FIG. 1, a prior art approach uses simple diagrams with American Standard Code for Information Interchange (ASCII) text descriptions to show the progression of instructions within the performance simulator. One disadvantage with the prior art diagram is that the textual descriptions are difficult to read. In other words, the engineer must have a thorough knowledge of the hardware design to understand the textual descriptions. Furthermore, the prior art diagram can display only limited textual information. For example, if the textual descriptions for the instructions are long, the prior art diagram must reduce the number of instructions displayed in order to accommodate the long textual descriptions on a display screen. Finally, the prior art diagram is not interactive and the engineer cannot obtain more information than what is displayed on the display screen.

As a result, there is a need for a method for displaying and tracking the progression of instructions within the performance simulator that the engineer can easily understand and providing an interactive display that can accommodate more information.

SUMMARY OF THE INVENTION

Broadly speaking, the present invention fills these needs by providing a method for graphically tracking a progression of instructions through hardware components. It should be appreciated that the present invention can be implemented in numerous ways, including as a process, an apparatus, a system, computer readable media, or a device. Several inventive embodiments of the present invention are described below.

One embodiment provides a method for graphically tracking a progression of instructions through hardware components. Instructions of a code segment are defined by graphical icons where each graphical icon has a displayable appearance that identifies a type of instruction. The method tracks each graphical icon when simulating execution of the code segment through the hardware components. The method then displays a progression of each graphical icon through the hardware components during execution of the code segment.

Another embodiment provides a computer readable medium having program instructions for graphically tracking a progression of instructions through hardware components. The program instructions define graphical icons for instructions of a code segment where each graphical icon has a displayable appearance that identifies a type of instruction. Further, the program instructions track each graphical icon when simulating execution of the code segment through the hardware components. Thereafter, the program instructions display a progression of each graphical icon through the hardware components during execution of the code segment.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is a prior art diagram with ASCII text descriptions that shows a progression of instructions within a performance simulator.

DETAILED DESCRIPTION OF THE EXEMPLARY EMBODIMENTS

An invention is disclosed for a method for graphically tracking a progression of instructions of a code segment through one or more hardware components in a performance simulator. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

The embodiments described herein provide a method for graphically tracking the progression of instructions through hardware components. In order to assist a user to debug the performance simulator or a hardware design, the method uses graphical icons to graphically represent instructions of a code segment. When the code segment is executed in simulation, the method tracks each instruction executed through the hardware components. In turn, the progression of the instructions, represented by the graphical icons, through the hardware components is graphically displayed on a display screen. This graphical display allows the user to quickly visualize the internal operations of the performance simulator.

Embodiments of the present invention can be implemented using C language, C++ language, Java™, or any other programming language. As embodiments of the present invention can be implemented in Java, a brief introduction to Java is provided below. Java is a programming language designed to generate applications that can run on all hardware platforms, small, medium and large, without modification. Developed by Sun Microsystems, Java has been promoted and geared heavily for the Web, both for public Web sites and Intranets. Generally, Java programs can be called from within HTML documents or launched standalone.

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. Client applications written in Java can be interpreted, or more commonly, compiled "just in time" to native machine code, and thus achieving the performance of native binaries without sacrificing the portability inherent in Java. On the server side, Java programs can also be compiled into machine language for faster performance. However a compiled Java program loses hardware independence as a result.

Figure 2:
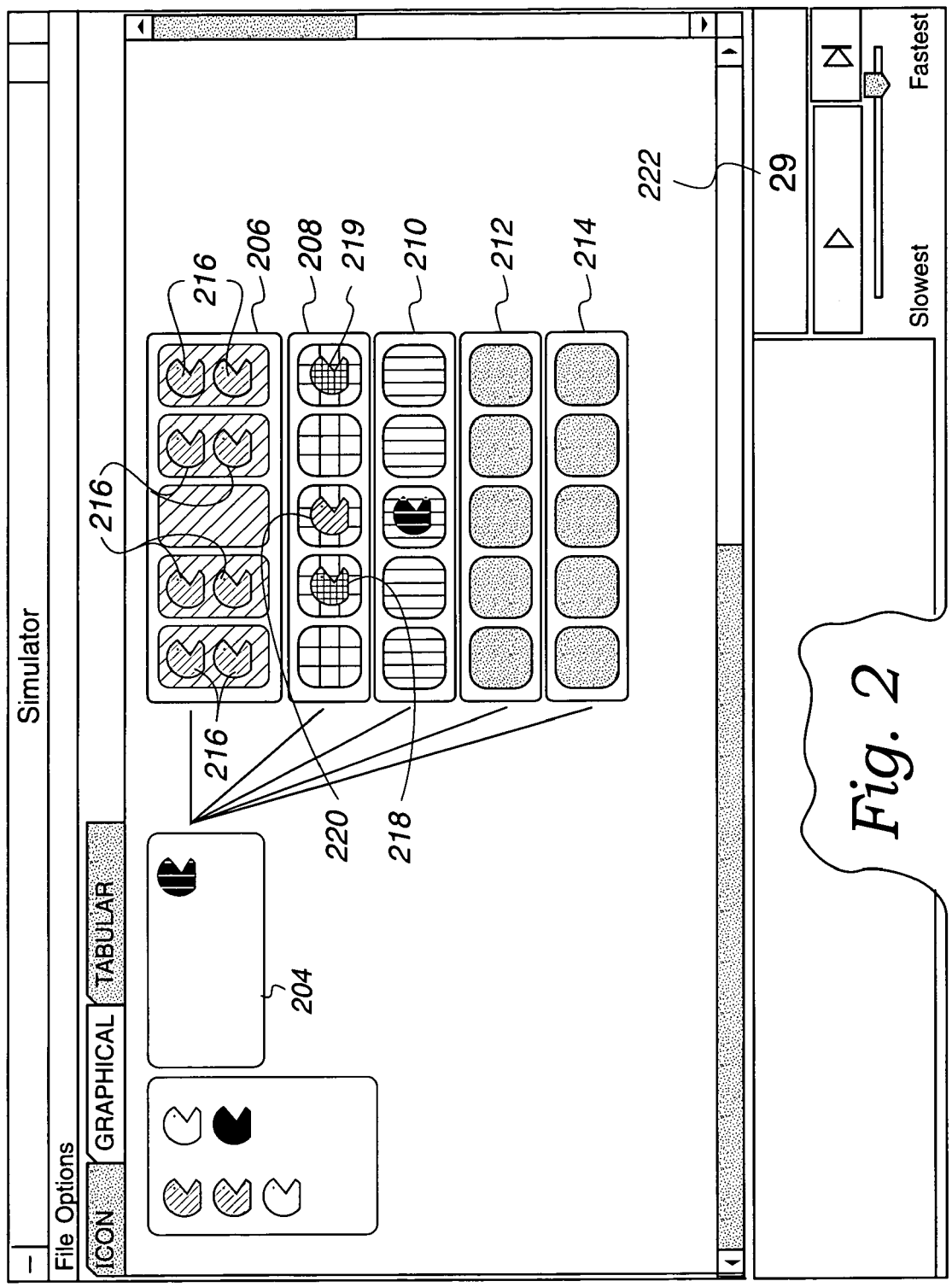
FIG. 2 shows an exemplary graphical view of a performance simulator simulating a CPU, in accordance with one embodiment of the present invention.

FIG. 2 shows an exemplary graphical view of a performance simulator simulating a central processing unit (CPU), in accordance with one embodiment of the present invention. In particular, the graphical view shows locations of instructions within hardware components of the CPU at a specific time during execution of a code segment. Generally speaking, executing the code segment of a computer program generates instructions to the CPU. Examples of the instructions include a load instruction, an add instruction, a subtract instruction, a store instruction, a branch instruction, a register movement instruction, a shift instruction, input/output instructions, etc. In one embodiment, graphical icons, like graphical icons 216, 218, 219, and 220, represent the instructions and each graphical icon has a displayable appearance that identifies a type of instruction. As shown, the graphical icons have a displayable appearance of a circular shape with different colors and patterns used for identifying different instructions. However, in another embodiment, the displayable appearance of the graphical icons can be defined by any suitable geometric shape (e.g., rectangle, square, circle, triangle, etc.), alphanumeric character (e.g., A,v,t,Q,1,9,10, etc.), symbol (e.g., $,*,@, α, ﬀﬀ,¤,♥, etc.), shading, pattern (e.g., solid, hatch, stripes, dots, etc.), and color.

As shown in FIG. 2, rectangles graphically represent the hardware components of the CPU. However, any suitable geometric shape can graphically represent the hardware components. The hardware components include an instruction buffer 204, an integer instruction execution pipeline 206, a loads and stores execution pipeline 208, a branch execution pipeline 210, a floating point add execution pipeline 212, and a floating point multiply execution pipeline 214.

The performance simulator can also simulate other suitable hardware components. Exemplary embodiments of hardware components include microprocessors, address switches, data switches, memory controllers, Ethernet, networks, data caches, memory, busses and interconnects, motherboard routing, protocols, etc. The hardware components should be broadly defined to include any suitable hardware attribute of a circuit or a chip. The hardware attribute can include any part that defines the attribute. For example, the hardware attribute can include circuit elements, buses, connections, combination of circuit elements, groups of logic, sub-components, system components, and any related circuit element that glues components together, either physically, logically, or by their communication. As a result, although FIG. 2 shows the simulation of the CPU, this is not meant to be limiting, as the performance simulator can simulate the instruction through any hardware attribute of the circuit.

When the code segment is executed, instructions are generated to the CPU and, within the CPU, the execution pipelines 206, 208, 210, 212, and 214 pick corresponding instructions from the instruction buffer 204. For example, the integer instruction execution pipeline 206, represented by a hatch pattern rectangle, needs to pick add instructions, represented by hatch pattern graphical icons, from the instruction buffer 204. As shown in FIG. 2, hatch pattern graphical icons 216 are located in the integer instruction execution pipeline 206. The presence of the hatch pattern graphical icons 216 in the hatch pattern rectangle graphically shows to the user that the integer instruction execution pipeline 206 picked the correct add instructions. In another example, the loads and stores execution pipeline 208, represented by a square pattern rectangle, needs to pick loads and stores instructions represented by square pattern graphical icons. As shown in FIG. 2, square pattern graphical icons 218 and 219 are correctly located in the loads and stores execution pipeline 208. However, another hatch pattern graphical icon 220 representing an add instruction is also located in the loads and stores execution pipeline 208. The presence of the hatch graphical icon 220 shows that the loads and stores execution pipeline 208 also picked an incorrect add instruction. Thus, the graphical display assists the user to quickly check visually whether there is an error in the performance simulator or in the CPU design.

Figure 3:
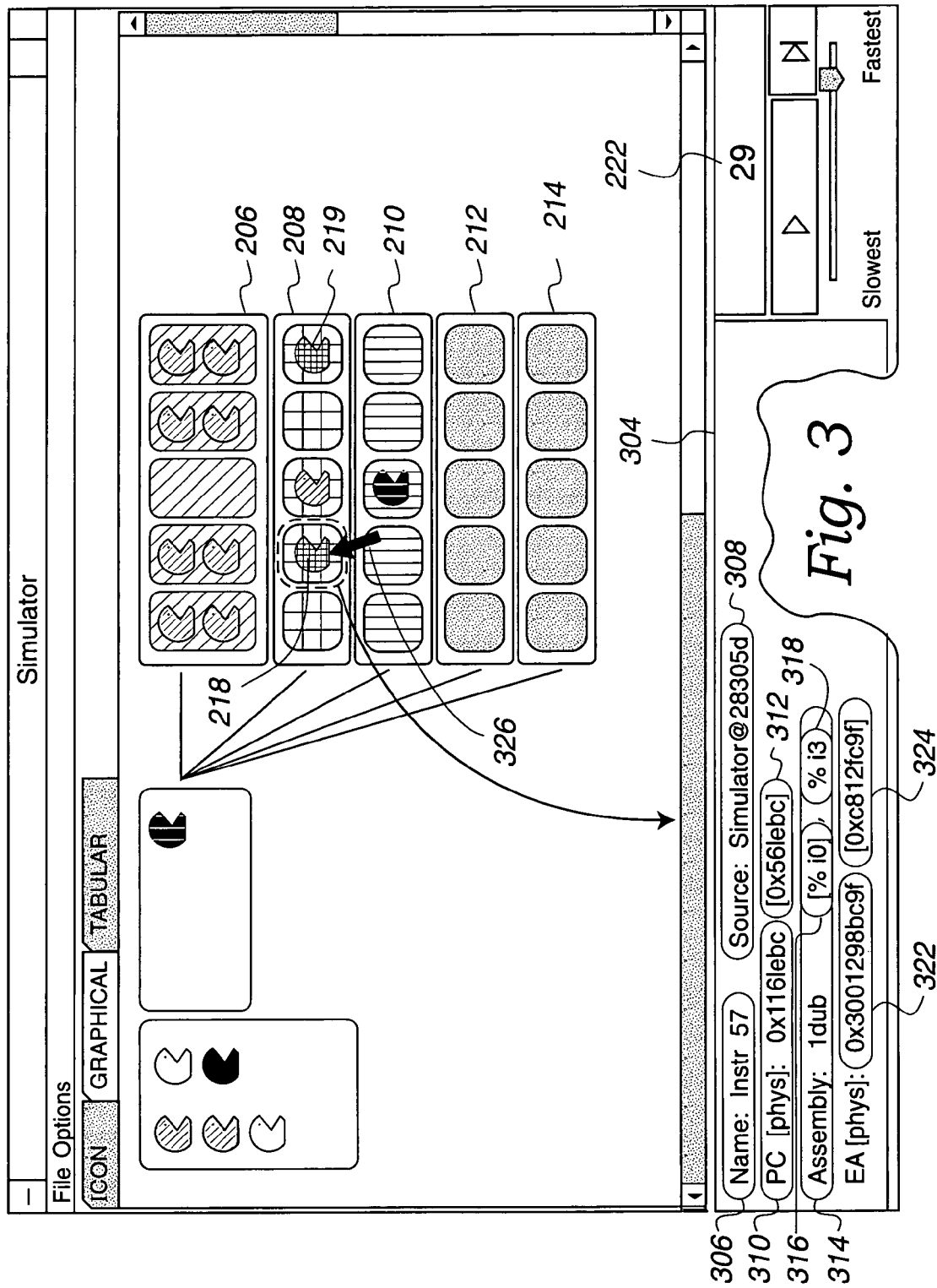
FIG. 3 shows a separate display of information associated with a selection of a graphical icon, in accordance with one embodiment of the present invention.

FIG. 3 shows a separate display of information associated with a selection of the graphical icon 218, in accordance with one embodiment of the present invention. If a user wants detailed information associated with a particular graphical icon, like the graphical icon 218, the user can select the graphical icon 218. The user may select the graphical icon 218 through the use of a mouse, a trackball, a keyboard, a touch sensitive display, or any suitable input device. As shown in FIG. 3, the user directs a cursor 326 using a mouse onto the graphical icon 218 and clicks the mouse button to select the graphical icon 218. In another example, the user may touch the graphical icon 218 on a touch sensitive display to select the graphical icon 218.

The selection of the graphical icon 218 causes displays of information associated with the graphical icon 218. In one embodiment, a separate display screen 304 located at the bottom of the graphical display provides textual information associated with the graphical icon 218. In another embodiment, the information displayed is graphical. Exemplary embodiments of information associated with the graphical icon 218 include a name of the instruction 306, an internal representation of the instruction 308, a program counter associated with an instruction 310, a physical memory location of the instruction 312, an instruction disassembly 314, a register source 316, a register destination 318, a virtual addresses 322 of data, and a physical address 324 of the data to be loaded.

Figure 4:
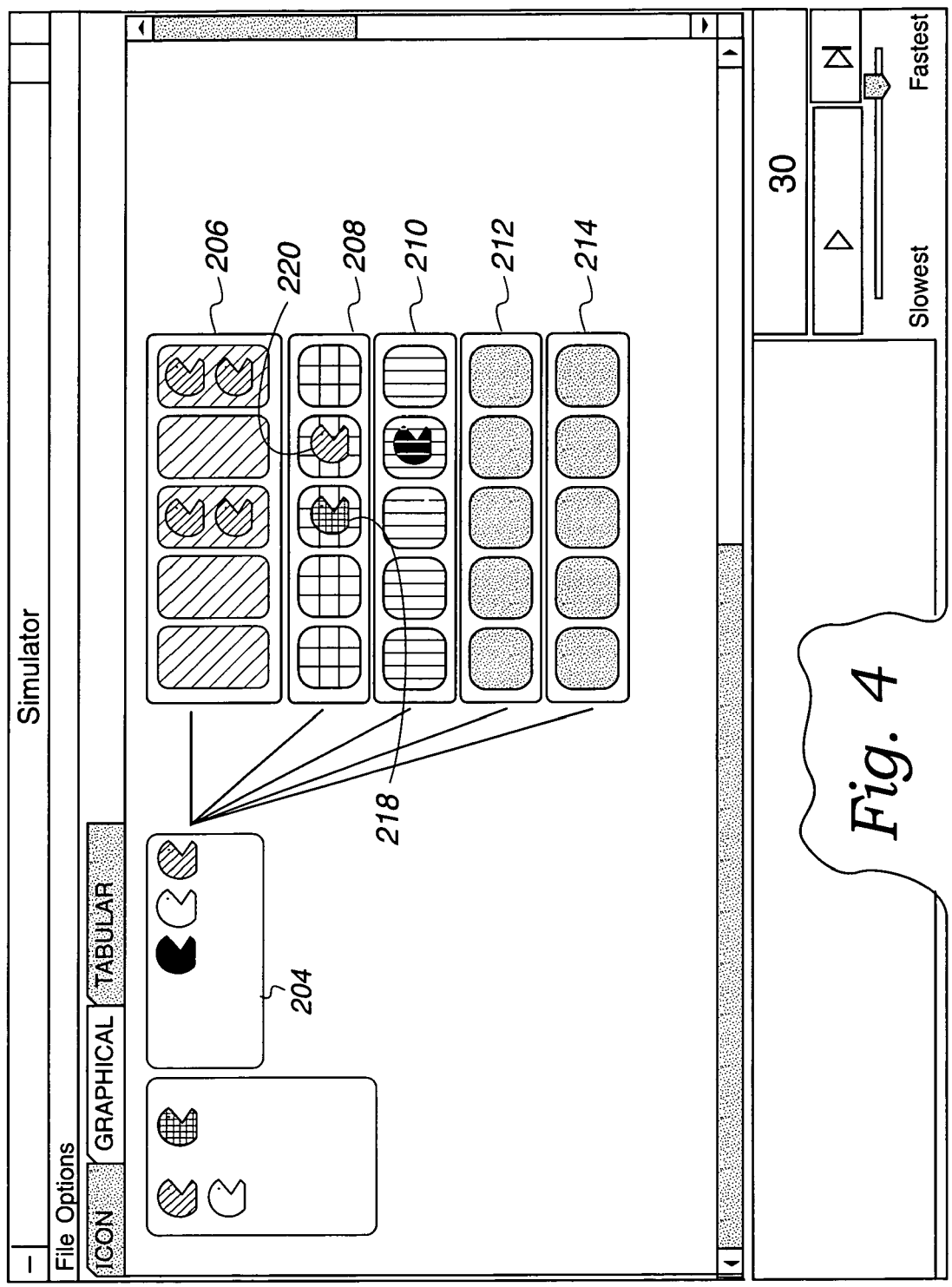
FIG. 4 shows a graphical view of a next progression of instructions at a next clock cycle 30, in accordance with one embodiment of the present invention.

The graphical views in FIG. 2 and FIG. 3 show the performance simulator at a specific instant of time, and specifically, at clock cycle 29, as shown in a small display 222 at the bottom corner of the graphical view. In another embodiment, a progression of each of the graphical icons through the hardware components within the CPU during execution of the code segment can be graphically displayed. In other words, the graphical view can also display movement of the instructions, represented by graphical icons, through the hardware components over a period of time. In an exemplary embodiment, FIG. 4 shows a graphical view of a next progression of instructions at a next clock cycle 30. This graphical view shows that the graphical icons are not in the same locations as shown in FIG. 2 and FIG. 3. For instance, from clock cycle 29 to the next clock cycle 30, the square pattern graphical icon 218 and the hatch graphical icon 220 progressed to different boxes within the loads and stores execution pipeline 208. Essentially, the instructions, represented by graphical icons, are processed in order defined by the code segment. The processing of the instructions enables the display of first processed instructions through later stages of the hardware components and enables simultaneous display of later processed instructions through earlier hardware stages of the hardware components.

Figure 5:
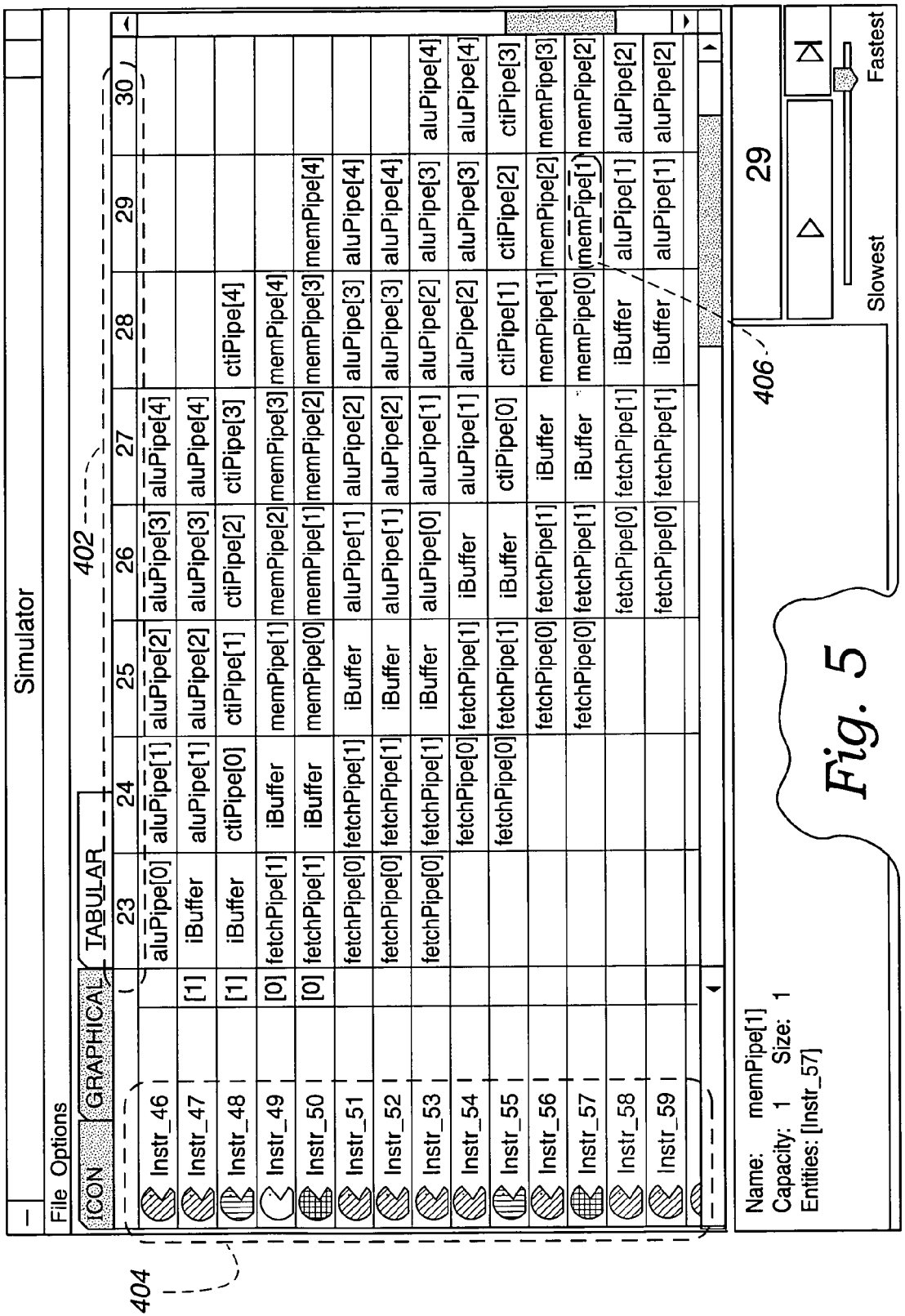
FIG. 5 shows a tabular view of a time history of a progression of instructions, in accordance with one embodiment of the present invention.

FIG. 5 shows a tabular view of a time history of a progression of instructions, in accordance with one embodiment of the present invention. The tabular view displays a hardware location for each graphical icon spanning a period of time. The period of time can be in any time increment (e.g., clock cycles, milliseconds, seconds, minutes, etc.). As shown, textual descriptions symbolize the hardware components. However, in another embodiment, graphical icons can also represent the hardware components. A vertical axis 404 lists the instructions and a horizontal axis 402 lists time increments in clock cycles. In particular, the horizontal axis 402 shows time increasing from left to right. Thus, unlike the graphical view described above which shows graphical icons at a specific instant of time, the tabular view shows the time history of the instructions over a span of time.

For example, a user can locate the location of instruction 57, represented by the graphical icon 218 in FIG. 2, at clock cycle 29 by looking up Instr_57 along the vertical axis 404 and looking up clock cycle 29 along the horizontal axis 402 to locate memPipe[1] 406. The hardware component mem-Pipe[1] 406 corresponds to the loads and stores execution branch 208 in FIG. 2. As a result, the tabular view provides the hardware location of instruction 57 at a specific clock cycle 29 as well as the hardware locations at clock cycles 25 through 30, in accordance with one embodiment of the present invention.

Figure 6:
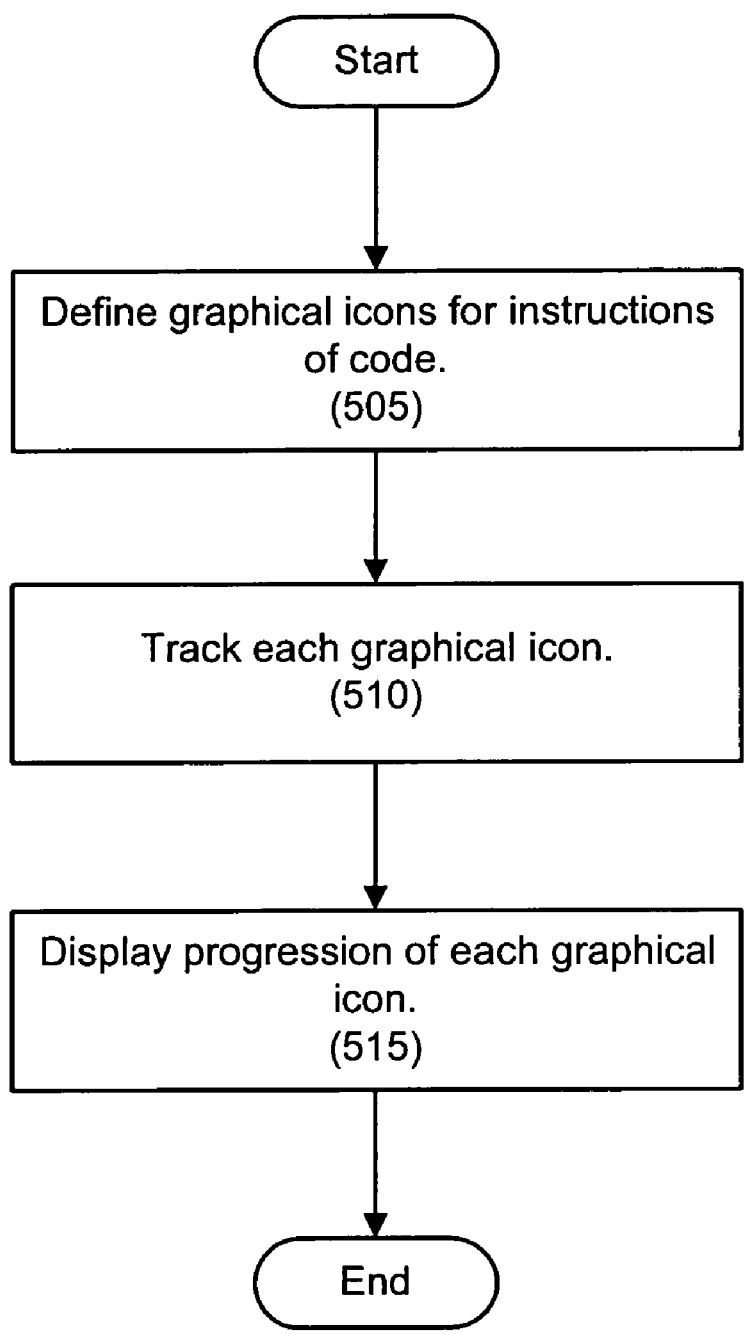
FIG. 6 is a flowchart diagram illustrating the method operations for graphically tracking a progression of instructions through hardware components, in accordance with one embodiment of the present invention.

FIG. 6 is a flowchart diagram illustrating the method operations for graphically tracking a progression of instructions through hardware components, in accordance with one embodiment of the present invention. Starting in operation 505, instructions of a code segment are defined by graphical icons where each graphical icon has a displayable appearance that identifies a type of instruction. Thereafter, in operation 510, the method tracks each graphical icon when simulating execution of the code segment through the hardware components. In order to track each graphical icon, the method essentially monitors the instructions entering and departing from the hardware components, in accordance with one embodiment of the present invention. Finally, in operation 515, the method displays a progression of each graphical icon through the hardware components during execution of the code segment.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for graphically tracking a progression of instructions through one or more hardware components, comprising:

defining a plurality of graphical icons for a plurality of instructions of a code segment, each of the plurality of graphical icons having a displayable appearance that identifies a type of instruction;

tracking each of the plurality of graphical icons when simulating execution of the code segment through the one or more hardware components by generating a graphical display of a plurality of execution pipelines, each of which has indicia associated therewith that differs from the indicia associated with the remaining pipelines of said plurality of execution pipelines and placing a subset of said plurality of graphical icons adjacent to a first sub-portion of said indicia associated with one of said plurality of execution pipelines; and displaying a progression of each of the plurality of graphical icons through the one or more hardware components during the execution of the code segment by sequentially placing graphical icons of said subset adjacent to additional sub-portions of said indicia associated with said one of said plurality of execution pipelines.

2. The method of claim 1, wherein each of the icons of said subset having said displayable appearance with characteristics matching a characteristic of indicia associated with said one of plurality of execution pipelines and distinguishable from characteristics of indicia associated with the remaining execution pipelines of said plurality of execution pipelines, when placed adjacent thereto.

3. The method of claim 2, wherein said sub-portion and said additional sub-portions define multiple sub-portions, each of which corresponds to a clock cycle that differs from a clock cycle corresponding to the remaining sub-portions of said multiple sub-portions.

4. The method of claim 1, wherein displaying the progression of each of the plurality of graphical icons includes, displaying a tabular view of the progression of each of the plurality of graphical icons through the one or more hardware components during the execution of the code segment.

5. The method of claim 1, further comprising, selecting the plurality of graphical icons to cause displays of information associated with the plurality of graphical icons.

6. The method of claim 5, wherein the information is defined by one or more of a name of the instruction, an internal representation of the instruction, a program counter associated with an instruction, a physical memory location of the instruction, an instruction disassembly, a register source, a register destination, a virtual addresses of data, and a physical address of the data to be loaded.

7. The method of claim 1, wherein the displayable appearance is defined by one or more of a geometric shape, a shading, a pattern, an alphanumeric character, a symbol, and a color.

8. The method of claim 1, wherein the progression is movement between the one or more hardware components through intervals of time.

9. The method of claim 1, wherein the method operation of tracking each of the plurality of graphical icons includes, monitoring the plurality of graphical icons entering into the one or more hardware components; and
monitoring the plurality of graphical icons departing from the one or more hardware components.

10. The method of claim 1, wherein the one or more hardware components is defined by one or more of an instruction buffer, an integer instruction execution pipeline, a loads and stores execution pipeline, a branch execution pipeline, a floating point add execution pipeline, a floating point multiply execution pipeline, a microprocessor, an address switch, a data switch, a memory controller, an Ethernet, a network, a data cache, a memory, a bus, an interconnect, a motherboard routing, and a protocol.

11. The method of claim 1, wherein the execution of the code segment generates the instructions to the one or more hardware components.

12. The method of claim 1, wherein the plurality of instructions of the code segment are defined by one or more of a load instruction, an add instruction, a subtract instruction, a store instruction, a branch instruction, a register movement instruction, a shift instruction, an input instruction, and an output instruction.

13. A computer readable storage medium having program instructions stored thereon for graphically tracking a progression of instructions through one or more hardware components, comprising:

program instructions for defining a plurality of graphical icons for a plurality of instructions of a code segment, each of the plurality of graphical icons having a displayable appearance that identifies a type of instruction;

program instructions for tracking each of the plurality of graphical icons when simulating execution of the code segment through the one or more hardware components by generating a graphical display of a plurality of execution pipelines, each of which has indicia associated therewith that differs from the indicia associated with the remaining pipelines of said plurality of execution pipelines and placing a subset of said plurality of graphical icons adjacent to a first sub-portion of said indicia associated with one of said plurality of execution pipelines; and program instructions for displaying a progression of each of the plurality of graphical icons through the one or more hardware components during the execution of the code segment by sequentially placing graphical icons of said subset adjacent to additional sub-portions of said indicia associated with said one of said plurality of execution pipelines.

14. The computer storage readable storage medium of claim 13, wherein said program instruction for defining further includes a sub-routine to provide each of the icons of said subset with said displayable appearance having characteristics matching a characteristic of indicia associated with said one of plurality of execution pipelines and distinguishable from characteristics of indicia associated with the remaining execution pipelines of said plurality of execution pipelines, when placed adjacent thereto.

15. The computer storage readable medium of claim 14, wherein said sub-portion and said additional sub-portions define multiple sub-portions and further including a sub-routine to correspond each of said multiple sub-portions with a clock cycle that differs from a clock cycle corresponding to the remaining sub-portions of said multiple sub-portions.

16. The computer storage readable medium of claim 13, wherein the program instructions for displaying a progression of each of the plurality of graphical icons includes, program instructions for displaying a tabular view of the progression of each of the plurality of graphical icons through the one or more hardware components during the execution of the code segment.

17. The computer storage readable medium of claim 13, further comprising, program instructions for selecting the plurality of graphical icons to cause displays of information associated with the plurality of graphical icons.

18. The computer storage readable medium of claim 17, wherein the information is defined by one or more of a name of the instruction, an internal representation of the instruction, a program counter associated with an instruction, a physical memory location of the instruction, an instruction disassembly, a register source, a register destination, a virtual addresses of data, and a physical address of the data to be loaded.

19. The computer storage readable medium of claim 13, wherein the displayable appearance is defined by one or more of a geometric shape, a shading, a pattern, an alphanumeric character, a symbol, and a color.

20. The computer storage readable medium of claim 13, wherein the progression is movement between the one or more hardware components through intervals of time.

21. The computer storage readable medium of claim 13, wherein the program instructions for tracking each of the plurality of graphical icons includes, program instructions for monitoring the plurality of graphical icons entering into the one or more hardware components; and program instructions for monitoring the plurality of graphical icons departing from the one or more hardware components.

22. The computer storage readable medium of claim 13, wherein the one or more hardware components is defined by one or more of an instruction buffer, an integer instruction execution pipeline, a loads and stores execution pipeline, a branch execution pipeline, a floating point add execution pipeline, a floating point multiply execution pipeline, a microprocessor, an address switch, a data switch, a memory controller, an Ethernet, a network, a data cache, a memory, a bus, an interconnect, a motherboard routing, and a protocol.

23. The computer storage readable medium of claim 13, wherein the execution of the code segment generates the instructions to the one or more hardware components.

24. The computer storage readable medium of claim 13, wherein the plurality of instructions of the code segment are defined by one or more of a load instruction, an add instruction, a subtract instruction, a store instruction, a branch instruction, a register movement instruction, a shift instruction, an input instruction, and an output instruction.

* * * * *